Patented Dec. 23, 1930

1,786,205

UNITED STATES PATENT OFFICE

CLARENCE E. GREIDER, OF LAKEWOOD, OHIO, ASSIGNOR TO NATIONAL CARBON CO., INC., A CORPORATION OF NEW YORK

TRANSPARENT FILM

No Drawing.    Application filed July 2, 1928.   Serial No. 290,047.

My invention relates to transparent materials, and particularly to such material, adapted to the transmission of light within the visible spectrum and a definite portion of the ultra-violet light spectrum. It has for one of its objects the provision of a new and useful material for the glazing of windows, for light-filters, and such like purposes, to transmit all but the extremely short wave portion of the ultra-violet rays, or for other purposes where a light filter having such a transmission is useful.

It is known that certain unsaturated compounds such as vinyl acetate, vinyl chloride, etc., when properly treated are polymerized into solids which are of good strength, insoluble in most fluids, optically clear, and transparent to the visible spectrum. I find that polymerized vinyl acetate and its homologues, are transparent not only to the visible spectrum but also to the ultra-violet spectrum down to a wave length of about 2900 Ångstrom units, that shorter wave lengths are absorbed, and that the "cut-off" at this point is quite sharp, and constant.

In practicing my invention, I produce a film of the polymerized vinyl compound by any convenient means, which film may be composed of a polymerized vinyl compound, as the acetate, alone, or may contain other vinyl, or other unsaturated compounds as well as the usual diluents and saturated compounds, and may, if desired, include a wire mesh, a woven fabric, or other suitable reinforcing means for the provision of additional strength. The material so prepared has a high transmission for all of the visible spectrum and for the ultra-violet spectrum having wave lengths greater than about 2900 Ångstrom units, and absorbs the wave lengths shorter than about 2900 Ångstrom units.

The film of my invention is particularly adapted to the glazing of windows, because of its high strength, and resistance to weathering as well as its flexibility and elasticity. It is likewise highly resistant to mischances which injure glass windows. It transmits the beneficial ultra-violet rays which are absorbed by ordinary window glass. Accordingly it is highly desirable for the glazing of windows in such locations as children's nurseries, hospitals, greenhouses, and any place where it is desirable that living things shall have the benefit of the helpful ultra-violet radiation.

The light transmission, and the "cut-off" of the vinyl acetate film are approximately the same as the transmission and "cut-off" of the earth's atmosphere. Accordingly, a window glazed with the film of my invention interposes substantially no obstruction to the light radiation that is transmitted through the earth's atmosphere. In this respect the film of my invention is fundamentally different from other flexible glazing materials, all of which show transmissions and cut-off differing more or less widely from that of the atmosphere.

The filter film of my invention has the very highly advantageous properties, that the transmission and cut-off do not change materially with prolonged exposure to ultra-violet radiation. It is well-known that other filter materials are greatly injured and their transmissions grossly changed by prolonged exposure to such radiation. I find by experiment that exposure of the film of vinyl acetate for many hours to a high intensity of radiation, both ultra-violet and visible, results in no material change in its ultra-violet transmission, while such films as cellulose acetate or other organic films which transmit ultra-violet, when similarly exposed, show a rapid change in transmission and a rise of the "cut-off" point to 3200 Ångstrom units, or above.

Another aspect of my invention thus comprises the combination of a source of light producing a wide range of ultro-violet radiation, with the filter film of my invention, whereby radiant energy closely comparable in spectrum distribution to normal sunlight is obtained.

The filter of my invention is particularly advantageous in the artificial production of light corresponding to clear mountain sunlight. While the earth's atmosphere transmits substantially all of the radiation having a wave length greater than 2900 Ångstrom units, the presence in it of small amounts of smoke or dust causes the air to absorb most of the ultra-violet radiation. Thus inhabitants of smoky regions are frequently deprived of much of the helpful effects of the ultra-violet radiation. This loss may be minimized by the substitution of artificial radiation containing the desired wave lengths from an appropriate source. In connection with such use the filter of my invention is of great value. Artificial sources which emit light high in ultra-violet rays, such as carbon arc lamps trimmed with carbons treated with certain of the metals, or the mercury arc in quartz tubes, yield not only visible radiation, but radiation extending far down the spectrum, to wave lengths shorter than 2900 Ångstrom units. Where a substitute for sunlight for certain medicinal applications is desired, it is necessary that the wave lengths shorter than 2900 Ångstrom units be absorbed from such artificial sources, in order to produce a radiation as nearly as possible the same as the radiation received from the sun through the atmosphere. This result is obtainable by the combination of the filter of my invention with a suitable light source emitting quantities of ultra-violet rays.

A convenient means of application of the filter of my invention is in the form of a curtain before the light source, a sufficient distance away to be safe from heat produced by the source. When so used the filter produces the desired character of radiation, and it shows a high durability and a high stability, since the transmission does not change upon prolonged exposure to the ultra-violet radiation.

By my invention I have thus produced a new and useful glazing material and light filter which has a transmission and cut-off of great value, which is of excellent mechanical strength, and which is of high durability, and resistance to change from exposure to the elements.

The above disclosure shows but a limited number of embodiments of my invention, which may, however, be adapted to still other embodiments without departure from the spirit thereof, and I desire therefore that only such limitations shall be imposed upon the appended claims as are stated therein or required by the prior art.

I claim as my invention:

1. A light filter comprising a film of a polymerized vinyl compound and a reticulated member incorporated therein.

2. A light filter comprising a film of polymerized vinyl acetate.

3. A light filter comprising a film of polymerized vinyl acetate and an incorporated supporting means.

4. In combination a source of light rich in ultra-violet wave lengths and a filter cooperating therewith comprising a film of vinyl acetate.

5. A light source comprising an illuminant producing a light rich in ultra-violet wave lengths and a filter cooperating therewith, comprising a film of vinyl acetate and a supporting member comprising a woven fabric.

6. A glazing material comprising a film formed of a vinyl compound and a reticulated reenforcing member incorporated therein, said film having a radiation cut-off at about 2900 Ångstrom units and absorbing shorter wave lengths.

7. A glazing material comprising a film of a vinyl compound reinforced with a woven material, having a radiation cut-off at 2900 Ångstrom units and absorbing shorter wave lengths.

8. In combination an artificial source of ultra-violet radiation and a filter, transparent to ultra-violet radiation to about 2900 Ångstrom units and absorbing radiations of shorter wave lengths, comprising a film of polymerized vinyl compound.

In testimony whereof, I affix my signature.

CLARENCE E. GREIDER.